United States Patent
Tsai

[19]

[11] Patent Number: 6,008,944

[45] Date of Patent: Dec. 28, 1999

[54] OPTICAL DEVICE WITH OPTIONAL RESOLUTIONS

[75] Inventor: Jenn-Tsair Tsai, Taipei Hsien, Taiwan

[73] Assignee: Mustek Systems Inc., Hsinchu, Taiwan

[21] Appl. No.: 09/121,519

[22] Filed: Jul. 23, 1998

[30] Foreign Application Priority Data

Aug. 1, 1997 [TW] Taiwan .................................. 86213084

[51] Int. Cl.⁶ .................................................. G02B 27/10
[52] U.S. Cl. ........................ 359/618; 359/629; 359/799; 355/71; 353/38; 353/97
[58] Field of Search ..................................... 359/618, 629, 359/634, 227, 236, 722, 799, 800; 358/296, 401, 443, 483; 355/71; 353/38, 97

[56] References Cited

U.S. PATENT DOCUMENTS

| | | | |
|---|---|---|---|
| 5,473,393 | 12/1995 | Manabe | 353/38 |
| 5,767,951 | 6/1998 | Kiyotaki | 355/71 |
| 5,798,867 | 8/1998 | Uchida et al. | 359/629 |
| 5,850,281 | 12/1998 | Benker | 355/71 |

FOREIGN PATENT DOCUMENTS

| | | |
|---|---|---|
| 232398 | 10/1994 | Taiwan . |
| 235112 | 11/1994 | Taiwan . |
| 280480 | 7/1996 | Taiwan . |
| 281851 | 7/1996 | Taiwan . |
| 286850 | 9/1996 | Taiwan . |

*Primary Examiner*—Loha Ben
*Attorney, Agent, or Firm*—Greer, Burns & Crain, Ltd.

[57] ABSTRACT

An optical device with optional resolutions is provided for converting an image into electronic signals. The optical device includes a housing, a plurality of focusing units with various magnifying powers and the same optical path lengths mounted immobily in the housing for variously proportionally receiving the image and generating a focused image, a photoelectric conversion unit mounted immobily in the housing for converting the focused image into electronic signals, a selecting unit for having one of the focusing units selected according to the desired resolution, and a light-reflecting unit mounted immobily in the housing and between the photoelectric conversion unit and the focusing units for transmitting the focused image from the selected focusing unit to the photoelectric conversion unit.

16 Claims, 4 Drawing Sheets

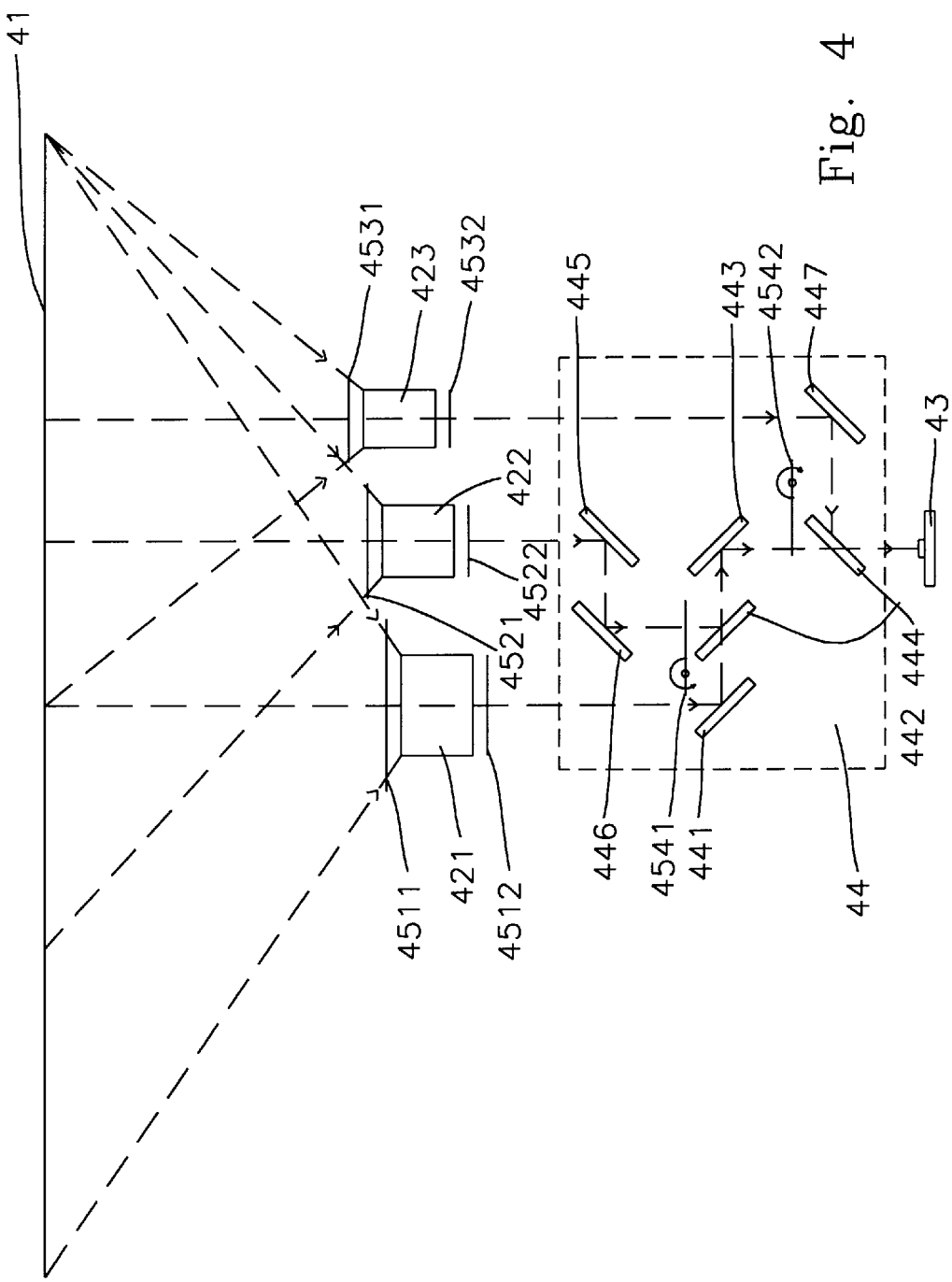

OPTICAL DEVICE WITH OPTIONAL RESOLUTIONS

FIELD OF THE INVENTION

The present invention is related to an optical device, and more particularly to an optical device with optional resolutions.

BACKGROUND OF THE INVENTION

Image processing is often used for photography or movie. As we know, the scanner plays an indispensable role in this field. Higher resolution is required to obtain more clear images, but the image files also occupy a larger space in the disk. An image of A4-size may be converted into a file of few megabytes when it is scanned with resolution of 600 dpi (dot per inch). Sometimes, an image with lower resolution is allowable so the size of the image file can be reduced significantly. The required resolution is various according to circumstances. For example, scanning a usual document requires a lower resolution, but scanning a beautiful photograph needs a higher resolution. Accordingly, the conventional scanner with single resolution is not suitable for all different kinds of images. Recently, the concept of a scanner with multiple resolutions has been proposed. It is conceivable that some additional elements are needed for "switching" among resolutions to achieve this concept.

A driving element is usually adopted to perform the "switching" function. The word "switching" means that some optical elements is driven by the driving element to be move along with the light path according to the desired resolution of the scanning operation. It is possible but not commercially practicable because any moving action is unfavorable to the precision of the scanner. Precise locations of the optical elements are very important. IF the optical elements are moved, no one can assure that they would be moved to the right positions. A slight error occurred in moving the optical element will cause a serious error in the resulting image file. In other to improve the above-described defects, it is necessary to make efforts for manufacturing the conventional scanner with multiple resolutions.

Please refer to FIG. 1 which shows the operational process of a conventional scanner. The piece of paper 11 is put on the scanning window to be scanned. As shown in FIG. 1A, if a lower resolution is acceptable, the low-magnifying powered lens 121 of the lens set 12 is moved to be located within the light path so that an image received by a charge coupled device 13 can be magnified to a smaller size. On the other hand, if a higher resolution is required, the high-magnifying powered lens 122 of the lens set 12 is moved to be located within the light path and an image received by the charge coupled device 13 is magnified to a larger size, as shown in FIG. 1B. The most serious disadvantage of this method is its unsatisfied precision resulting from the movement of the lens set 12. The method also has other disadvantages. To perform this moving function, an additional space is needed for locating the driving device and moving the optical elements. It is a tendency for modem machine to have a minimum size.

Many improved devices or methods have been disclosed. For instance, Taiwanese Patent Publication No. 281851 disclosed a method used for scanner, fax machine, copy machine or the like with optional resolutions. It teaches that both the zoom lens and the charge coupled device are movable, both of which are driven by a driving motor. In order to keep the precision of the machines, a calibrating unit is required. Besides, Taiwanese Patent Publication Nos. 286850 disclosed that the charge coupled device is moved by a ball screw. Other relevant patents, Taiwanese Patents Publication No. 232398, 235112, and 280480, teach that lenses are moved by their respective featured driving elements. The improvement of these prior publications seem nothing in comparison of their large volume, high production cost, and unsatisfied precision.

SUMMARY OF THE INVENTION

An objective of the present invention is to provide an optical device with optional resolutions on the condition that all optical elements are fixed immobily.

In accordance with the present invention, an optical device with optional resolutions includes a housing, a plurality of focusing units with various magnifying powers and the same optical path lengths mounted immobily in the housing for variously proportionally receiving an image and generating a focused image, a photoelectric conversion unit mounted immobily in the housing for converting the focused image into electronic signals, a selecting unit for having one of the focusing units selected according to the desired resolution, and a light-reflecting unit mounted immobily in the housing and between the photoelectric conversion unit and the plurality of focusing units for transmitting the focused image from the selected focusing unit to the photoelectric conversion unit.

In accordance with another aspect of the present invention, each of the plurality of focusing units is a lens. There are preferably two to four focusing units in the preferred embodiments. The photoelectric conversion unit is preferably a charge coupled device.

In accordance with another aspect of the present invention, the selecting unit is preferably a light shade set mounted on optical paths of the focusing units. The light shade set may include a movable light shade or a rotatable light shade.

In accordance with another aspect of the present invention, the light-reflecting unit preferably includes a first dichroic mirror for transmitting the focused image from the selected focusing unit to the photoelectric conversion unit. Several transmitting units such as reflective mirrors and dichroic mirrors corresponding to the respective focusing units are also included in the light-reflecting unit for transmitting the focused image from the selected focusing unit to the first dichroic mirror.

In accordance with another aspect of the present invention, the light-reflecting unit further includes another reflective mirror or dichroic mirror for equalizing the optical path lengths of the focusing units.

In accordance with another aspect of the present invention, there are a first lens and a second lens in one preferred embodiment. The selected focusing units is the first lens and the second lens in a first instance and in a second instance respectively.

In accordance with another aspect of the present invention, the selecting unit includes a movable light shade. The movable light shade is positioned on the optical path of second lens in the first instance, and the movable light shade is positioned on the optical path of first lens in the second instance.

In accordance with another aspect of the present invention, the selecting unit includes two movable light shades. The first movable light shade is moved away from the optical path of first lens in the first instance, and positioned on the optical path of first lens in the second instance. Similarly, the second movable light shade is positioned on the optical path of second lens in the first instance, and moved away from the optical path of second lens in the second instance.

In accordance with another aspect of the present invention, the light-reflecting unit preferably includes a rotatable light shade. The rotatable light shade is rotated to be positioned on the optical path of second lens in the first instance, and to be positioned on the optical path of first lens in the second instance.

In accordance with another aspect of the present invention, the light-reflecting unit preferably includes a dichroic mirror and three reflective mirrors. The first reflective mirror and second reflective mirror are mounted on the optical path of first lens. The third reflective mirror is mounted on the optical path of second lens. The only dichroic mirror is used for transmitting the focused image from the first lens to the photoelectric conversion unit through the first reflective mirror and the second reflective mirror in the first instance, and transmitting the focused image from the second lens to the photoelectric conversion unit through the third reflective mirror in the second instance.

The present invention may best be understood through the following description with reference to the accompanying drawings, in which

BRIEF DESCRIPTION OF THE DRAWINGS

FIG. 4 is a schematic diagram showing other preferred embodiments of the operation of a scanner according to the present invention operates.

DETAILED DESCRIPTION OF THE PREFERRED EMBODIMENTS

The present invention will be described more detailedly with reference to the following embodiments. It is to be noted that the following descriptions of the preferred embodiments of this invention are presented herein for the purpose of illustration and description only; it is not intended to be exhaustive or to be limited to the precise form disclosed.

Figure 1A:
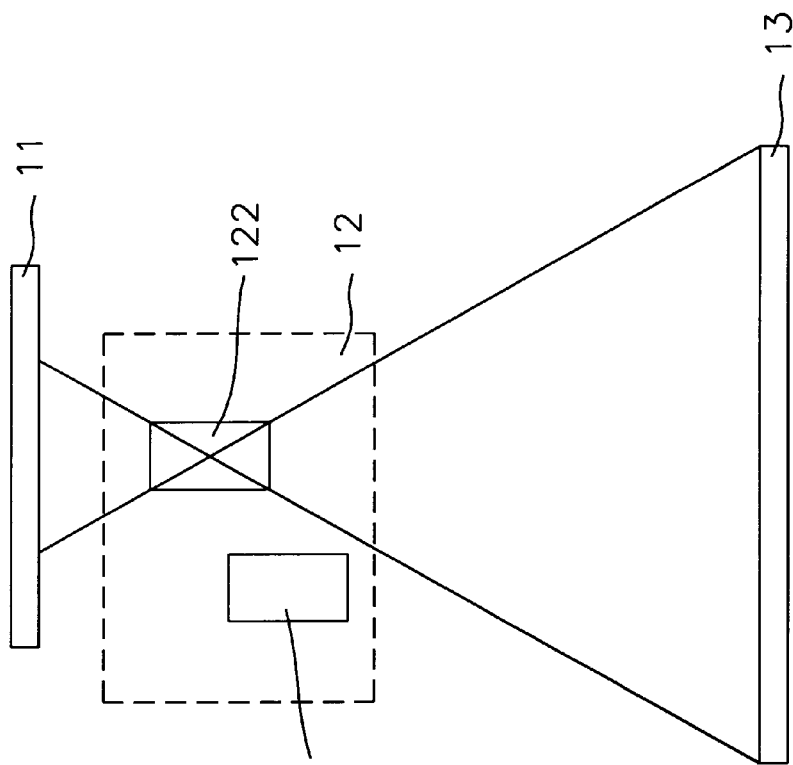
FIGS. 1A and 1B are schematic diagrams showing the operation of a conventional scanner.
Figure 1B:
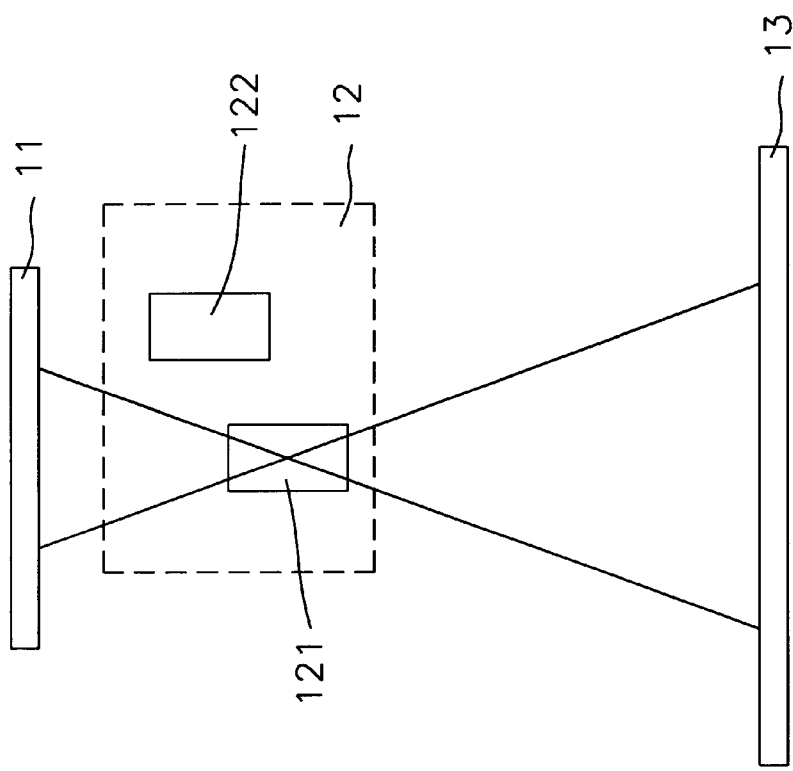
Figure 2:
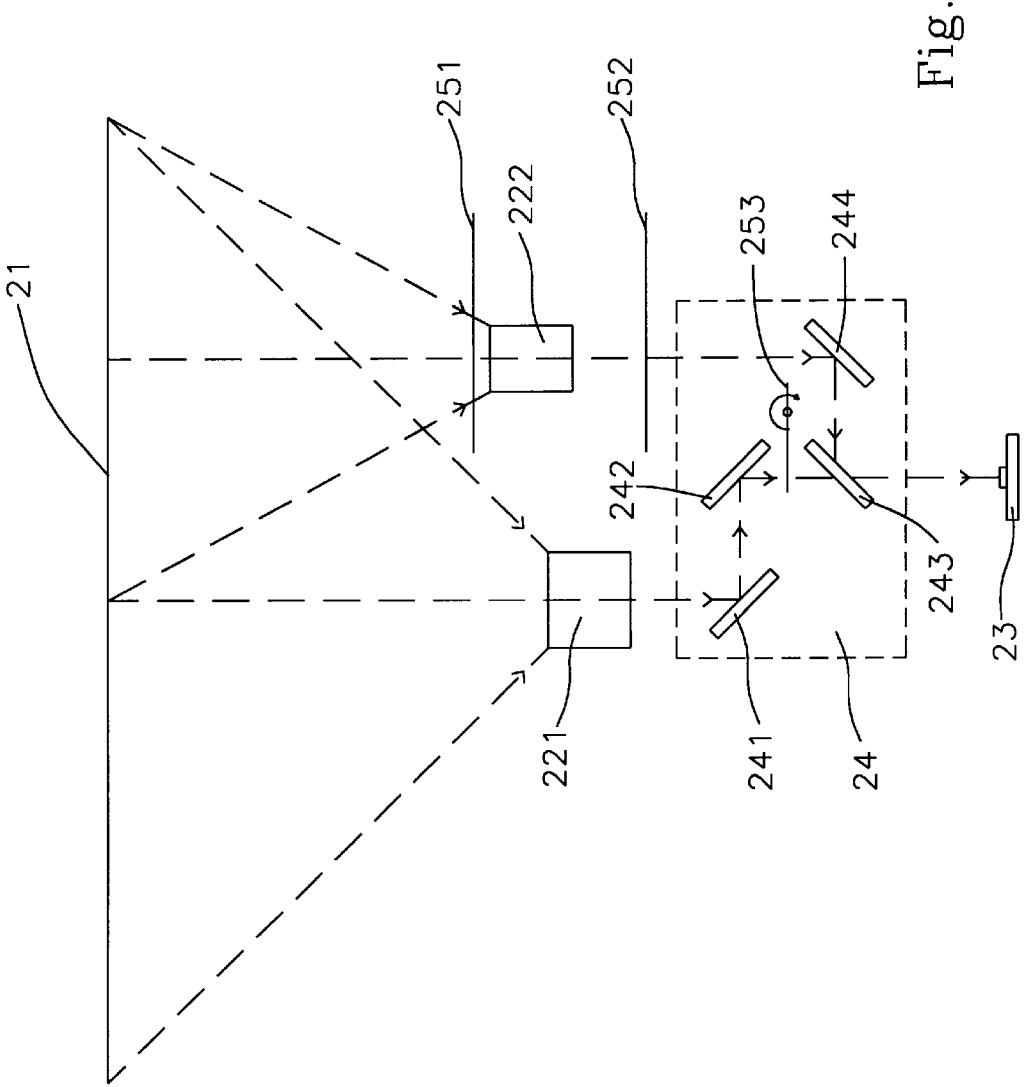
FIG. 2 is a schematic diagram showing some preferred embodiments of the operation of a scanner according to the present invention operates.

Please refer to FIG. 2 which is a schematic diagram showing some preferred embodiments of a scanner according to the present invention. The scanner has two lenses 221 and 222 which are mounted in specific locations so that the object distance and image distance of lens 221 are different from those of lens 222 according to the lens maker's equation. Hence, the magnifying power of lens 221, defined as the ratio of image distance to object distance, is also different from that of lens 222. Moreover, the width of lens 221 is larger than that of lens 222 and thus the lens 221 can receive larger portion of initial image 21. That is why we claim that lenses 221 and 222 variously proportionally focus the initial image 21. A piece of paper is put on the scanner for generating the initial image 21. The initial image 21 is focused to form a focused image to be transmitted to a charge coupled device 23. A light-reflecting unit 24 is used for transmitting the focused image to the charge coupled device 23. The light-reflecting unit 24 includes a dichroic mirror 243 and three reflective mirrors 241, 242, and 244. The so-called dichroic mirror has different physical properties such as reflectance and transmittance on the opposite sides. In the following embodiments, the dichroic mirror performs as a glass on one side and as a conventional mirror on the other side. In other words, the dichroic mirror can transmit light on the glass-like side and reflect light on the mirror-like side. The light shades are defined as "selecting unit" because they are used for obstructing undesired images, that is, "selecting" one desired image which will be transmitted later. There are three preferred embodiments shown in FIG. 2. In one preferred embodiment, the selecting unit includes only one of the light shades 251, 252, and 253. The three preferred embodiments will be described in detail as follows.

Embodiment 1

In the first preferred embodiment, the equipped light shade is a movable light shade 251. If a lower resolution is acceptable, the movable light shade 251 is moved to the location in front of lens 222 so that the lens 222 can not receive the initial image 21. Thus, the initial image 21 will be focused by the lens 221 to generate a focused image rather than by the lens 222. The generated focused image is transmitted to the charge coupled device 23 by way of reflective mirror 241, reflective mirror 242, and dichroic mirror 243 in sequence. Then, the charge coupled device 23 converts the sensed focused image to electronic signals which will be processed later. On the other hand, if a higher resolution is required, the movable light shade 251 is moved leftwards to be located in front of the lens 221. The light path of the initial image 21 to the lens 221 is obstructed by the movable light shade 251 so the initial image 21 can not be focused by the lens 221. The initial image 21 is focused by the lens 222 to generate a focused image, and the focused image is transmitted to the charge coupled device 23 by way of reflective mirror 244 and dichroic mirror 243 in sequence. Thereafter, the charge coupled device 23 converts the focused image to electronic signals which will be processed later. It is noted that the optical path length of image distance plus object distance in those two conditions of high resolution and low resolution is the same.

Embodiment 2

In the second preferred embodiment, the movable light shade 251 is displaced by another movable light shade 252 mounted between the light-reflecting unit 24 and the lenses 221 and 222. If a lower resolution is acceptable, the movable light shade 252 is moved to the location in back of the lens 222 so the focused image generated by the lens 222 is obstructed by the movable light shade 252 and can not reach the charge coupled device 23. Only the focused image generated by the lens 221 can be transmitted to the charge coupled device 23. On the other hand, if a higher resolution is required, the movable light shade 252 is moved leftwards to be located in back of the lens 221 and only the focused image generated by the lens 222 can reach the charge coupled device 23 which will convert the focused image into electronic signals. The light paths of transmitted focused image with high or low resolution and other relevant operating principles are the same as those described in EMBODIMENT 1 in the foregoing paragraph and will not be explained tautologically.

Embodiment 3

In stead of the movable light shades, the rotatable light shade 253 is equipped within the light-reflecting unit 24. If a lower resolution is allowable, the rotatable light shade 253 is rotated to be in a vertical direction between the dichroic mirror 243 and reflective mirror 244. Thus, the focused image generated by the lens 222 is obstructed by the rotatable light shade 253 and can not reach the charge coupled device 23. Another focused image generated by the lens 221 can be transmitted to the charge coupled device 23 by the light-reflecting unit 24, and is converted into electronic signals by the charge coupled device 24. On the contrary, if a higher resolution is necessary, the rotatable light shade 253 is rotated to be in a horizontal direction between the reflective mirror 242 and dichroic mirror 243 so the focused image generated by the lens 221 is obstructed and can not be received by the charge coupled device 23. Another focused image generated by the lens 222 can be transmitted to the charge coupled device 23 and then is converted into electronic signals by the charge coupled device 23 later. The light paths of transmitted focused image and other relevant scanning principles with reference to this preferred embodiment are the same as those in the above-described embodiments and would not be illustrated again. The words "vertical" and "horizontal" are used for illustrating this embodiment more clearly but are not essential. The only matter borne in mind is that the rotatable light shade must shade the undesired focused image.

Figure 3:
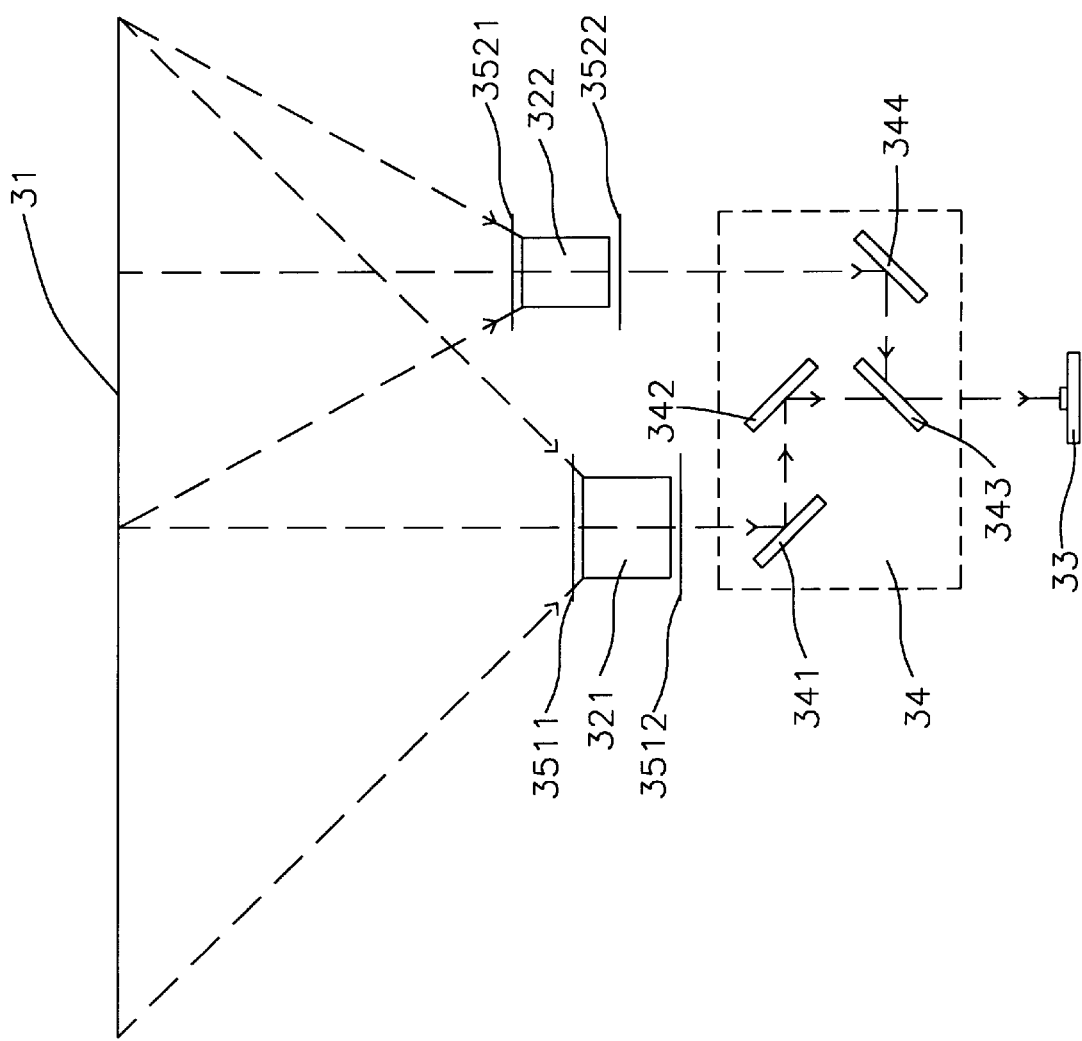
FIG. 3 is a schematic diagram showing another preferred embodiments of the operation of a scanner according to the present invention operates.

Please refer to FIG. 3 which is a schematic diagram showing another preferred embodiment of a scanner according to the present invention. The operating principle of this scanner is similar to that of the above-described embodiments. Each lens is accompanied by only one movable light shade. In other words, only one of the movable light shades 3511 and 3512 is adopted to match lens 321 in the scanner. By the same token, only one of the movable light shades 3521 and 3522 is needed. All possible movable light shades shown in the diagram are not essential. They are shown in order to indicate all the possibilities.

Embodiment 4

Supposing the movable light shades 3511 and 3512 are the adopted movable light shades, the scanning process is illustrated as follows. If a lower resolution is allowable, the movable light shade 3511 belonged to lens 321 is dislodged from lens 321 while the other movable light shade 3521 is placed at its original position in front of lens 322 so the light path of initial image 31 to the lens 322 is obstructed. The initial image 31 is focused by the lens 321 and a focused image is generated. A light-reflecting unit 34 is used for transmitting the desired focused image to the charge coupled device 33. The light-reflecting unit 34 includes a dichroic mirror 343 and three reflective mirrors 341, 342, and 344. The focused image is transmitted to the charge coupled device 33 by way of reflective mirror 341, another reflective mirror 342, and dichroic mirror 343 in sequence. Finally, the charge coupled device 33 converts the sensed focused image into electronic signals. Likewise, if a high resolution is required, the movable light shade 3521 is dislodged while the other movable light shade 3511 is placed at its original position in front of lens 321 to obstruct the light path of initial image 31 to the lens 321. Hence, the initial image 31 can be focused by the lens 322 rather than by the lens 321. The focused image is generated after the initial image 31 is focused by the lens 322 and then is transmitted to the charge coupled device 33 through the reflective mirror 344 and dichroic mirror 343. Thereafter, and the focused image is converted to electronic signals. The functions of other units are the same as indicated before. It should be noted that the optical path length of image distance plus object distance of each lens is the same.

The feature of these described preferred embodiments is that the optical elements such as lenses, light-reflecting unit, and charge coupled device are immobily mounted in the housing when the resolution of the scanner is changed. The precision of the scanner is obviously influenced by the positions of optical elements. According to the present invention, a movable light shade or rotatable light shade is adopted to switch the resolution of the scanner by shading the charge coupled device from undesired focused images or by shading the nonindicated lenses from initial image. The precision of the scanner according to the present invention keeps unerring because the positions of other optical elements will not be influenced by moving the movable light shade or rotating the rotatable light shade. The other driving elements provided in the prior arts for the are not needed in the present invention so that the size and the production cost are reduced significantly.

The number of focusing units can be increased to meet one's requirement, especially from two to four. Their working functions are similar to those described above. Please refer to FIG. 4 which is a schematic diagram showing other preferred embodiments of a scanner having three lenses according to the present invention. The scanner has three lenses 421, 422, and 423 mounted in specific locations so the object distance and image distance of each lens are different according to the lens maker's equation. Hence, the magnifying powers, defined as the ratio of image distance to object distance, of lenses are also different. Furthermore, the lens 421 is the widest lens and the lens 423 is the narrowest lens so the lens 421 can receive the largest portion of initial image 41. That is why we claim that lenses 421, 422, and 423 variously proportionally focus the initial image 41. The initial image 41 is focused to form a focused image transmitted to a charge coupled device 43. There are two types of applications in this diagram. One utilizes movable light shades and the other utilizes rotatable light shades. The embodiments are described and indicated as follows.

Embodiment 5

In this preferred embodiment, each lens is accompanied by only one movable light shade. In other words, only one of the movable light shades 4511 and 4512 is adopted to match lens 421. By the same token, only one of the movable light shades 4521 and 4522, and only one of the movable light shades 4531 and 4532 are needed. All possible movable light shades shown in the diagram are not essential. They are shown in order to indicate all the possibilities. For example, the selecting unit includes the movable light shades 4511, 4521, and 4531. If a lower resolution is allowable, the movable light shade 4511 belonged to lens 421 is dislodged from lens 421 while the other movable light shades are provided at their original positions in front of lenses 422 and 423 respectively so that the light paths of initial image 41 to the lenses 422 and 423 are obstructed. The initial image 41 is focused by lens 421 for generating a focused image. The focused image is transmitted to the charge coupled device 43 through the reflective mirror 441, dichroic mirror 442, reflective mirror 443, and dichroic mirror 444 in sequence. Then, the charge coupled device 43 converts the focused image to electronic signals. Likewise, if a higher resolution is required, the movable light shade 4521 is dislodged while the other movable light shades are placed at their original positions in front of lenses 421 and 423 respectively. The initial image 41 is focused by the lens 422 and a desired focused image is generated. The desired focused image is transmitted to the charge coupled device 43 through the reflective mirror 445, reflective mirror 446, dichroic mirror 442, reflective mirror 443, and dichroic mirror 444 in sequence. Thereafter, the focused image is converted into electronic signals. Similarly, if the highest resolution is necessary, the movable light shade 4531 belonged to the lens 423 is dislodged while other movable light shades are placed at their original positions in front of lenses 421 and 422 respectively. Therefore, the initial image 41 can not reach the lenses 421 and 422. The initial image 41 is focused by the lens 423 for generating focused image to be transmitted to the charge coupled device 43 by way of reflective mirror 447 and dichroic mirror 444 in sequence. Finally, the focused image is converted into electronic signals by the charge coupled device 43.

Embodiment 6

In stead of movable light shades, two rotatable light shades 4541 and 4542 are mounted within the light-reflecting unit 44. The initial image 41 is focused by the lenses 421, 422, and 423, so three focused images are generated. They are focused images with lower resolution, with higher resolution, and with highest resolution respectively. If a lower resolution is allowable, the rotatable light shade 4541 is rotated to be in a horizontal direction between the reflective mirror 446 and dichroic mirror 442 while the other rotatable light shade 4542 is rotated to be in a vertical direction between the dichroic mirror 444 and the reflective mirror 447. The focused image generated by the lens 421 can be transmitted to the charge coupled device 43 through the light-reflecting unit 44, but undesired focused images generated by the lenses 422 and 423 are obstructed by the rotatable light shades 4541 and 4542 respectively. Likewise, if a higher resolution is required, the rotatable light shade 4541 is rotated to be in a vertical direction between the reflective mirror 441 and the dichroic mirror 442 while the other rotatable light shade 4542 is also rotated to be in a vertical direction between the dichroic mirror 444 and reflective mirror 447. The desired focused image generated by the lens 422 is transmitted to the charge coupled device 43 through the light-reflecting unit 44, and then is converted to electronic signals by the charge coupled device 43. Other undesired focused images generated by the lenses 421 and 423 can not reach the charge coupled device 43 because they are obstructed by the rotatable light shades 4541 and 4542 respectively. By the same token, if the highest resolution is necessary, the rotatable light shade 4542 is rotated to be in a vertical direction between the reflective mirror 443 and the dichroic mirror 444. The desired focused image is transmitted to the charge coupled device 43 through the light-reflecting unit 44, and then is converted to electronic signals by the charge coupled device 43. Regarding to the undesired focused images, they are obstructed by the rotatable light shade 4542 and can not reach the charge coupled device 43. The light paths of each focused image have been described in EMBODIMENT 5 and do not be explained again. It should be noted that the words "horizontal" and "vertical" shown in this paragraph are only used for illustrating the embodiment more clearly. The directions of rotatable light shades are not essential. The necessary condition is that they can completely obstruct the undesired focused images.

Optical elements such as lenses, light-reflecting unit, and charge coupled device are immobily fixed in the housing when the resolution of the scanner is changed according to the present invention. The method according to the present invention is to eliminate undesired focused image in stead of capturing the desired focused image. The movable light shade and rotatable light shade which may be located within light paths of initial image or focused images are adopted to shade the charge coupled device from the undesired focused images. The precision of the scanner according to the present invention keeps unerring because the positions of other optical elements will not be affected by moving or rotating the light shades. The other driving elements for the precision or additional charge coupled device for the optional resolutions in the prior arts are not necessary for the present invention so that the size and the production cost can be reduced a lot. Accordingly, the present invention really conforms to the genius of modern technology.

While the invention has been described in terms of what are presently considered to be the most practical and preferred embodiments, it is to be understood that the invention need not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An optical device with optional resolutions for converting an initial image into electronic signals by a specific resolution, comprising:

a housing;

a plurality of focusing units with various magnifying powers and the same optical path lengths mounted immobily in said housing for variously proportionally receiving said initial image and generating a focused image;

a photoelectric conversion unit mounted immobily in said housing for converting said focused image into said electronic signals;

a selecting unit for having one of said plurality of focusing units selected according to said specific resolution; and a light-reflecting unit mounted immobily in said housing and between said photoelectric conversion unit and said plurality of focusing units for transmitting said focused image from said selected focusing unit to said photoelectric conversion unit.

2. The optical device according to claim 1 wherein each of said plurality of focusing units is a lens.

3. The optical device according to claim 1 wherein said photoelectric conversion unit is a charge coupled device.

4. The optical device according to claim 1 wherein said selecting unit is a light shade set mounted on optical paths of said plurality of focusing units.

5. The optical device according to claim 4 wherein said light shade set comprises a movable light shade.

6. The optical device according to claim 4 wherein said light shade set comprises a rotatable light shade.

7. The optical device according to claim 1 wherein said light-reflecting unit comprises a first dichroic mirror for transmitting said focused image from said selected focusing unit to said photoelectric conversion unit.

8. The optical device according to claim 7 wherein said light-reflecting unit further comprises a plurality of transmitting units each of which is one of a reflective mirror and a dichroic mirror for transmitting said focused image from said selected focusing unit to said first dichroic mirror.

9. The optical device according to claim 8 wherein said light-reflecting unit further comprises another reflective mirror for equalizing said optical path lengths of said plurality of focusing units.

10. The optical device according to claim 8 wherein said light-reflecting unit further comprises another dichroic mirror for equalizing said optical path lengths of said plurality of focusing units.

11. The optical device according to claim 1 wherein a total number of said plurality of focusing units if from 2 to 4.

12. The optical device according to claim 11 wherein said plurality of focusing units are a first lens and a second lens, said selected focusing unit being said first lens in a first instance and being said second lens in a second instance respectively.

13. The optical device according to claim 12 wherein said selecting unit comprises a movable light shade positioned on an optical path of said second lens in said first instance, and positioned on an optical path of said first lens in said second instance.

14. The optical device according to claim 12 wherein said selecting unit comprises:
   a first movable light shade moved away from an optical path of said first lens in said first instance and positioned on said optical path of said first lens in said second instance; and
   a second movable light shade positioned on an optical path of said second lens in said first instance and moved away from said optical path of said second lens in said second instance.

15. The optical device according to claim 12 wherein said selecting unit comprises a rotatable light shade rotated to be positioned on an optical path of said second lens in said first instance, and to be positioned on an optical path of said first lens in said second instance.

16. The optical device according to claim 12 wherein said light-reflecting unit comprises:
   a first reflective mirror mounted on an optical path of said first lens for transmitting said focused image from said first lens in said first instance;
   a second reflective mirror mounted on said optical path of said first lens for transmitting said focused image from said first reflective mirror in said first instance;
   a third reflective mirror mounted on an optical path of said second lens for transmitting said focused image from said second lens in said second instance; and
   a dichroic mirror for transmitting said focused image from said second reflective mirror to said photoelectric conversion unit in said first instance, and transmitting the focused image from said third reflective mirror to said photoelectric conversion unit in said second instance.

* * * * *